March 23, 1965 E. J. BANKO ET AL 3,174,422
AIR-FLOW CONTROL MEANS
Filed Feb. 5, 1963 2 Sheets-Sheet 1

INVENTORS
EDWARD J. BANKO
FRANK P. VULTAGGIO
BY Felshin and Rosen
ATTORNEYS

March 23, 1965   E. J. BANKO ET AL   3,174,422
AIR-FLOW CONTROL MEANS
Filed Feb. 5, 1963   2 Sheets-Sheet 2

INVENTORS
EDWARD J BANKO
FRANK P. VULTAGGIO
BY
ATTORNEYS

United States Patent Office 3,174,422
Patented Mar. 23, 1965

3,174,422
AIR-FLOW CONTROL MEANS
Edward J. Banko and Frank P. Vultaggio, Colonia, N.J., assignors to L. J. Wing Mfg. Co., Division of Aero-Flow Dynamics, Inc., Linden, N.J., a corporation of New York
Filed Feb. 5, 1963, Ser. No. 256,454
12 Claims. (Cl. 98—40)

This invention relates to means for controlling the direction of flow of air in accordance with the temperature of the air.

An object of the present invention is to provide improved means for controlling the direction of flow of air in accordance with its temperature so that the air is introduced into a room in a direction which increases downwardly as the temperature of the air increases.

Another object is to provide apparatus for varying the temperature of air with improved means for controlling the direction of flow of the air into a room in accordance with the temperature of the air.

A further object is to provide air flow direction control means that can be easily secured to the air outlet discharge openings of existing air temperature controlling apparatus for providing means in such apparatus for controlling the direction of flow of the air from said openings in accordance with the temperature of the air.

The above and other objects, features and advantages of the invention will be more fully understood from the following description of the invention considered in connection with the accompanying illustrative drawings of an embodiment of the invention.

Figure 1:
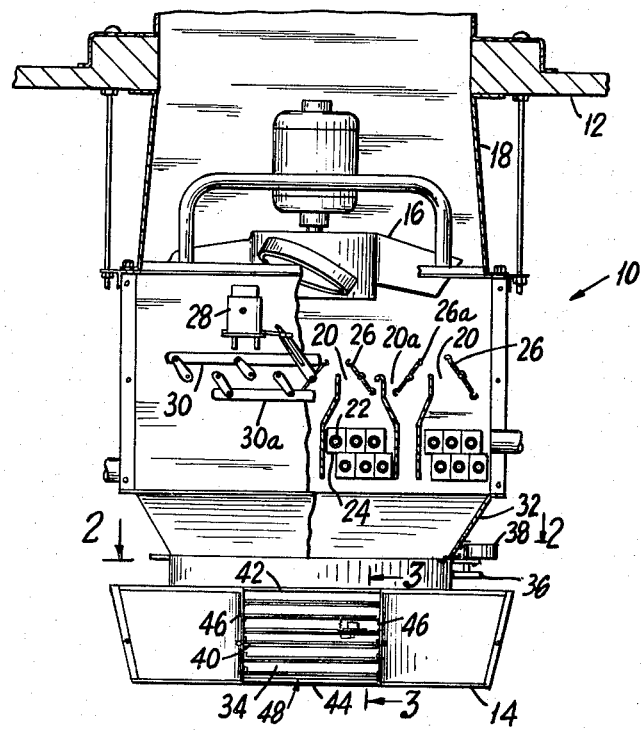
FIG. 1 is a vertical view, with parts omitted, of an air heater in accordance with the present invention.

Referring now to the drawings in detail, the heater 10 illustrated by FIG. 1 is of the type which includes provision for taking fresh air from out-of-doors, heating it, and distributing it where needed at comfortable predetermined temperatures, although it will be understood that the invention is applicable to other heaters and apparatus for varying the temperature of air, including coolers. As shown herein, heater 10 is suspended from the ceiling 12 of a room into which air at a predetermined temperature is introduced from the discharge outlet casing 14 of the heater. The heater includes a motor operated fan 16 which receives fresh air from a duct 18 and transmits the air through a series of laterally spaced passages 20 which are separated from each other by intervening passages 20a. Passages 20 are each provided with a series of tubes 22 having the usually heat transfer fins 24. For heating purposes, the tubes can be supplied with steam or hot water, but it will be understood that if cooling is desired, the tubes can be supplied with chilled water or other coolants. It is to be noted that passages 20a are devoid of any devices for changing the temperature of the air flowing therethrough.

The inlet ends of passages 20 are provided with dampers 26 and the inlet ends of passages 20a are provided with dampers 26a. The dampers control the volume of air passing through the companion passage. Dampers 26a are controlled by a damper motor 28 through a linkage 30 and dampers 26 are similarly controlled by a damper motor (not shown) through a linkage 30a. The damper motors are actuated by a suitable thermostat and the motors operate the associated dampers so that the blended discharge stream of air at the outlet ends of the passages are at the even desired temperature and constant volume, since dampers 26 and 26a operate oppositely with respect to each other.

The blended stream of air passes through duct 32 into the discharge casing 14 which, as herein shown, is provided with four outlet openings 34, equally spaced circumferentially from each other. The air is discharged through the outlet openings into the room.

In accordance with the invention, each outlet opening is provided with means for controlling the direction of flow of the air into the room in accordance with the temperature of the air. More particularly, when the air is relatively cool, for example 80° F., the air is discharged from each outlet opening in a horizontal direction. On the other hand, when the air is relatively warm, for example 120° F., it is discharged from each outlet opening in a downward direction toward the floor. This arrangement provides optimum conditions in the room which is supplied with the treated air.

Casing 14 can be of the stationary type which would be rigidly connected to the lower end of duct 32 or, as herein shown, can be of the revolving type operated by a friction drive wheel 36 driven by a suitably supported motor 38. The casing is a hollow member made of sheet metal and each of the outlet openings 34 is rectangular. The air flow direction control means for each opening is the same, so only one will be described.

Figure 4:
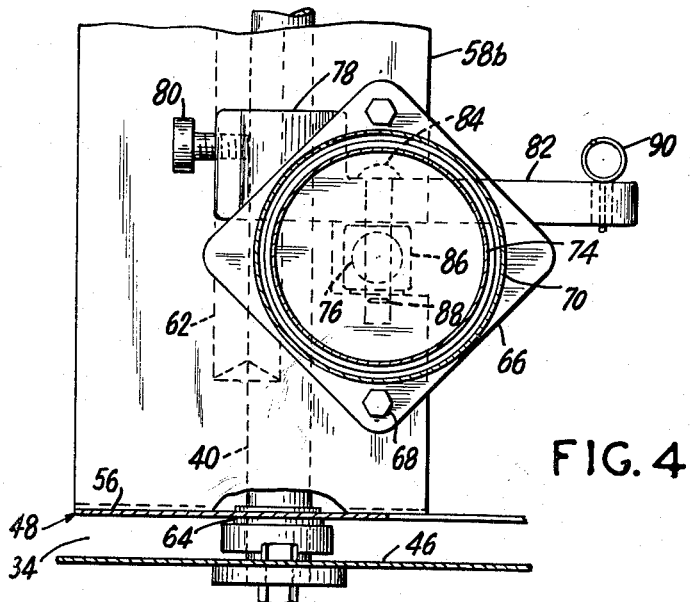
FIG. 4 is a horizontal view, on a larger scale, taken on line 4—4 of FIG. 3.

A horizontal stationary shaft 40 extends across opening 34, about midway between the top 42 and bottom 44 of the opening, and is suitably secured at its opposite ends to the adjacent side 46 of the opening. An air diffuser 48 is mounted for pivotal movement on shaft 40 in outlet opening 34 and in the path of flow of the air. The diffuser comprises a rectangular hollow rigid frame 50 having a top 52, bottom 54, and horizontally spaced vertical sides 56. A series of laterally spaced, parallel vanes 58 extends longitudinally from one side 56 of the frame to its opposite side and the vanes are suitably secured at their opposite ends to the adjacent side of the frame. It is to be noted that the vanes extend transversely of the direction of flow of the air and the spaces 60 between the vanes provide passages for the air. Each vane is a relatively thin long sheet member provided with a longitudinally extending stiffening groove 62. The top 52 and bottom 54 of the frame of the diffuser are also in the shape of a vane. Top 52 is spaced below the top 42 of the outlet opening, and the latter is provided with a vane 58a to form an upper passage 60a. The ends of shaft 40 pass through the sides 56 of the frame which are provided with bearings 64 (FIG. 4) for rotary support of the frame on the shaft.

Figure 3:
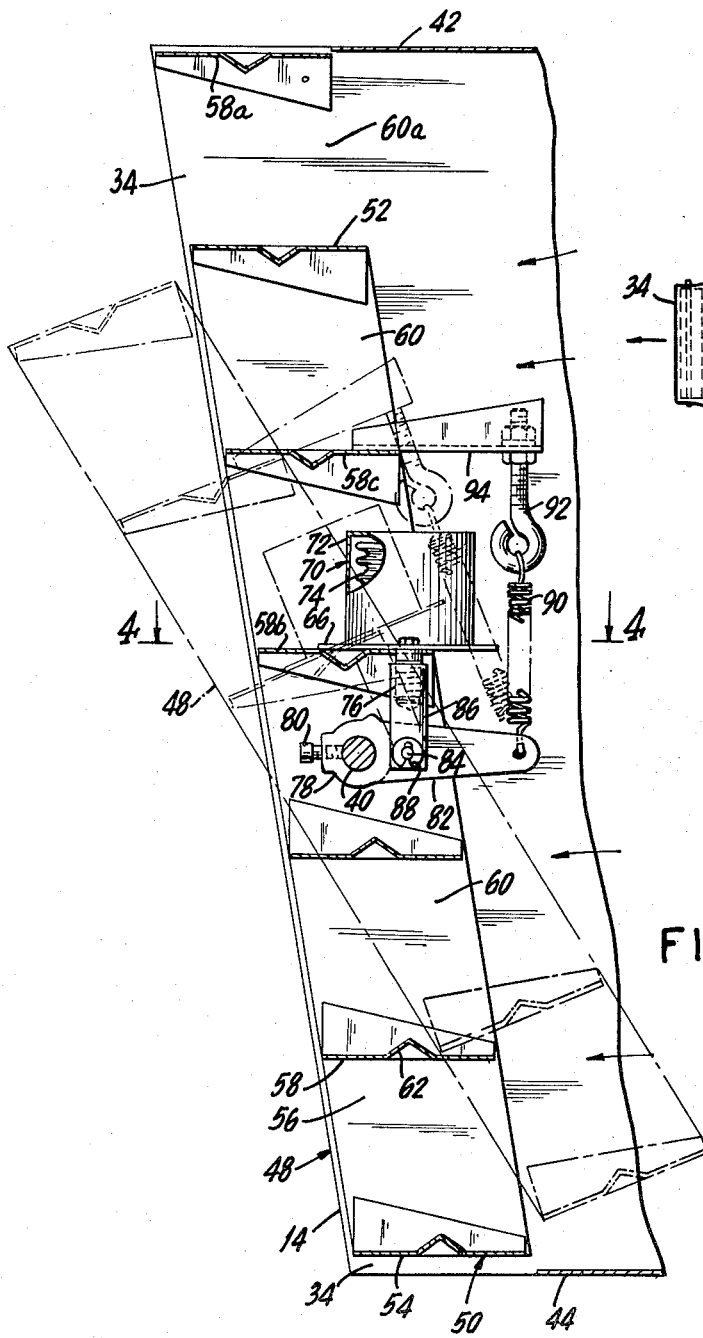
FIG. 3 is a vertical sectional view, on a larger scale, taken on line 3—3 of FIG. 1.
Figure 2:
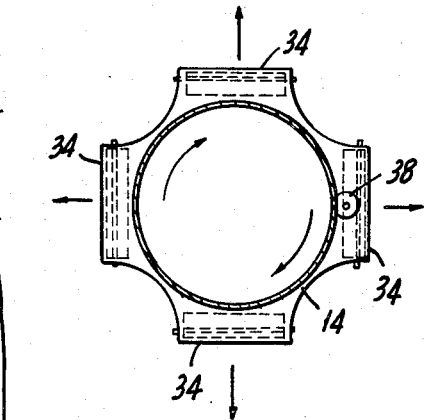
FIG. 2 is a horizontal cross section, on a smaller scale, taken on line 2—2 of FIG. 1.

Means is provided for controlling the position of the diffuser 48 in opening 34 so that when the diffuser is in the position shown in solid lines in FIG. 3, the air is discharged horizontally, and when the diffuser is in the position shown in broken lines in FIG. 3, the air is discharged downwardly, toward the floor. More particularly, a support plate 66 is secured by screws 68 to one of the vanes, designated 58b. A temperature responsive device 70 is secured to plate 66, in the path of flow of the air. Device 70 is a well-known bellows-type thermal responsive unit manufactured by the Fulton Sylphon Division of the Robertshaw-Fulton Controls Co. of New York, N.Y. It comprises a cylindrical hollow housing 72 in which is mounted an expansible bellows 74. A threaded rod 76 is operatively connected to the bellows and extends downwardly from housing 72 through support plate 66 and vane 58b. Upon increases of temperature, the bellows expands and causes rod 76 to extend outwardly from housing 72.

A crank 78 is secured, as by set screw 80, to shaft 40 and has an arm 82 which extends horizontally from the shaft inwardly toward the hollow of casing 14. A pin 84 is connected to arm 82 of the crank at a position spaced horizontally inwardly from shaft 40 and the pin extends from the side of arm 82 to provide a pivot support for the lower end of a tie bar 86 whose opposite end is internally threaded and screwed to rod 76. A cotter pin 88 holds the tie bar on the end of pin 84.

A return tension spring 90 is secured at its lower end to the end of arm 82 at a position which is spaced horizontally inwardly from pin 84. The upper and opposite end of the spring is secured to the hook end of an adjustable hook 92, and the opposite end of the hook is secured to a bracket 94 which is secured to vane 58c.

It is to be observed from the above description that upon increases of temperature, say from 80° F., rod 76 moves outwardly from the housing of the temperature responsive device and causes the diffuser to rotate in a counterclockwise direction, as viewed in FIG. 3, against the tension of spring 90, so that the vanes 58 are directed downwardly to direct the flow of the warm air downwardly. With decreases in temperature, the spring rotates the diffuser in a clockwise direction, as viewed in FIG. 3, to return the diffuser to the position shown in solid lines, whereby the vanes are horizontally and direct the flow of air from the discharge casing horizontally.

It is to be observed that the present invention provides a temperature responsive diffuser which is in the form of a complete assembly that may be readily mounted in a discharge air outlet opening by merely securing the respective ends of shaft 40, which extend from the sides 56 of the frame of the diffuser, to the adjacent side of the outlet opening.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for controlling the direction of flow of air in accordance with the temperature of said air, said apparatus comprising air diffusing means having a frame having a top, a bottom, a pair of horizontally spaced vertical sides and a series of vertically spaced vanes extending between said sides and secured at their respective ends to the adjacent sides of said frame, temperature responsive means mounted on one of said vanes in the path of flow of said air and having a bellows extendable different amounts corresponding, respectively, to different increases of the temperature of said air, said temperature responsive means including a part operatively connected to said bellows and movable in accordance with the movement of said bellows, a horizontal shaft positioned between said top and bottom of said frame and extending between and through said sides thereof for supporting said frame for pivotal movement in the path of flow of said air, the ends of said shaft being adapted to be fixedly secured to the side walls of an air passage or outlet, a radial arm connected to said shaft and having a part extending horizontally therefrom, another member pivotally connected to said extending part at a position laterally spaced from said shaft, said other member being adjustably connected to said movable part of said temperature responsive means so that said frame and its vanes are rotated in response to movement of said part of said temperature responsive means, and tension spring means connected at one of its ends to said radial arm at a position laterally spaced from said first mentioned position and connected at its opposite end to another one of said vanes for normally maintaining said air diffuser means in a position for directing said air horizontally, so that upon increases of temperature of said air, said air diffuser is pivoted to direct said air downwardly.

2. In apparatus for varying the temperature of air and which includes a fan and an air discharge outlet; means for controlling the direction of flow of said air from said outlet in accordance with the temperature of said air, said air flow controlling means comprising an air diffuser disposed within said outlet and having a rigid frame and a series of laterally spaced vanes extending between opposite sides of said frame and secured at their respective ends to the adjacent sides of said frame, temperature responsive means mounted on one of said vanes in the path of flow of said air and having a part movable to different positions corresponding, respectively, to different temperatures of said air, a shaft fixed to said outlet and extending across said outlet and supporting said air diffuser for pivotal movement in said outlet and in the path of flow of said air, a member secured to said shaft and having a part extending from said shaft, another member pivotally connected at one end to said extending part at a position spaced from said shaft and connected at its other end to said movable part of said temperature responsive means so that said air diffuser is moved in response to movement of said last mentioned part, and resilient means interconnecting said air to one of said vanes and said first mentioned member.

3. In apparatus for varying the temperature of air and which includes a fan and an air discharge outlet; means for controlling the direction of flow of said air from said outlet in accordance with the temperature of said air, said air flow controlling means comprising an air diffuser disposed within said outlet and including a frame having a top, a bottom, pair of a horizontally spaced vertical sides and a series of vertically spaced vanes extending between said sides and secured at their respective ends to the adjacent side of said frame, temperature responsive means mounted on one of said vanes in the path of flow of said air and having a bellows extendable different amounts correspondingly, respectively, to different increases of the temperature of said air, said temperature responsive means including a part operatively connected to said bellows and movable in accordance with the movement of said bellows, a horizontal shaft fixed to said outlet and positioned between said top and bottom of said frame and extending between said sides thereof and across said outlet for supporting said air diffuser for pivotal movement in said opening and in the path of flow of said air, a member fixedly connected to said shaft and having a part extending horizontally therefrom, another member pivotally connected to said extending part at a position laterally spaced from said shaft, said other member being adjustably connected to said movable part of said temperature responsive means so that said frame and vanes are rotated in response to movement of said part of said temperature responsive means, and tension spring means connected at one of its ends to said member at a position laterally spaced from said first mentioned position and connected at its opposite end to another one of said vanes for normally maintaining said frame and vanes in a position for directing said air horizontally, so that upon increases of temperature of said air, said frame and vanes are pivoted to direct said air downwardly.

4. In apparatus for varying the temperature of air and which includes a fan and an air discharge casing having a plurality of air discharge outlets; means for controlling the direction of flow of said air from at least one of said outlets in accordance with the temperature of said air, said air flow controlling means comprising an air diffuser for said one outlet, said air diffuser being located within said outlet and including a frame having a top, a bottom, pair of a horizontally spaced vertical sides and a series of vertically spaced vanes extending between said sides and secured at their respective ends to the adjacent sides of said frame, temperature responsive means mounted on one of said vanes in the path of flow of said air and having a bellows extendable different amounts corresponding, respectively, to different increases of the temperature of said air, said temperature responsive means including a part operatively connected to said bellows and movable in accordance with the movement of said bellows, a horizontal shaft fixed to said outlet and positioned between said top and bottom of said frame and extending between said sides thereof and across said one outlet opening for supporting said air diffuser for pivotal movement in said opening and in the path of flow of said air, a radial member fixedly connected to said shaft and having a part extending horizontally therefrom, another member pivotally connected to said extending part at a position laterally spaced from said shaft, said other member being adjustably connected to said movable part of said temperature responsive means so that said frames and vanes are rotated in response to movement of said part of said temperature responsive means, and tension spring means connected at one of its ends to said radial member at a position laterally spaced from said first mentioned position and connected at its opposite end to another one of said vanes for normally maintaining said air diffuser means in a position for directing said air horizontally, so that upon increases of temperature of said air, said air diffuser means is pivoted to direct said air downwardly.

5. In combination, an air outlet, an air diffuser within said outlet, diffuser mounting means within said outlet, means to fixedly attach said mounting means to said outlet, means to mount said diffuser on said mounting means for rotation of said diffuser relative to said mounting means and outlet, temperature responsive means mounted on said diffuser, and including a part movable in response to temperature change and means connecting said part to said mounting means to cause rotation of said diffuser from an initial position when said part moves in response to temperature change in air flowing by said temperature responsive means.

6. The combination of claim 5, and resilient means articulating said diffuser to said mounting means to move said diffuser back toward said initial position when the temperature of air flowing by said temperature responsive means reverses.

7. The combination of claim 6, said mounting means comprising a shaft, said connecting means comprising a radial arm fixed to said shaft, said part being connected to said arm, and said resilient means being connected to said arm.

8. The combination of claim 6, said diffuser comprising a frame having opposed sides connected to opposed ends, and parallel vanes fixedly connected at their ends to said opposed sides, and said mounting means comprising a shaft parallel to said vanes, and said sides having bearings through which said shaft passes.

9. The combination of claim 8, and said temperature responsive means being mounted on one of said vanes.

10. In apparatus for controlling the direction of flow of air in accordance with the temperature of said air, said apparatus comprising a fixed shaft, a diffuser rotatably mounted on said shaft, said diffuser comprising a frame having opposite sides, and spaced vanes connected to said opposite sides, said sides including bearing means for mounting said diffuser on said shaft, an arm fixed to said shaft, a temperature responsive member mounted on one of said vanes and having a pressure sensitive part responsive to the change of the temperature of the air flow, means connecting said part to said arm to cause rotation of said diffuser on said shaft in one direction in response to one kind of change in temperature of air passing by said member, and resilient means connecting said arm with another of said vanes, adapted to be loaded by movement of said diffuser in said one direction, to rotate said diffuser on said shaft in an opposite direction in response to opposite change of temperature of air passing by said member.

11. The combination of claim 10, an air outlet surrounding said diffuser, and means to fix said shaft to said outlet.

12. In combination, a fixed shaft, an air diffuser rotatably mounted on said shaft, temperature responsive means mounted on said diffuser in the path of air flowing through said diffuser, and including a part movable in response to temperature change, and means connecting said part with said shaft, to impose torque on said diffuser relative to said shaft, to cause rotation of said diffuser about said shaft, upon movement of said part due to change in temperature of air flowing through said diffuser and past said temperature responsive means.

References Cited by the Examiner
UNITED STATES PATENTS

| | | | |
|---|---|---|---|
| 1,607,745 | 11/26 | Palm | 236—46 |
| 2,057,494 | 10/36 | Leigh | 98—108 |
| 2,252,954 | 8/41 | Wheller | 98—40 |
| 2,390,630 | 12/45 | Wheller | 98—40 |
| 2,698,570 | 1/55 | Feinberg | 98—40 |

ROBERT A. O'LEARY, *Primary Examiner.*